(12) United States Patent
Tozawa et al.

(10) Patent No.: US 7,596,893 B2
(45) Date of Patent: Oct. 6, 2009

(54) WORK MACHINE (75) Inventors: Shoji Tozawa, Tokyo (JP); Madoka Binnaka, Tokyo (JP); Hideto Furuta, Tokyo (JP)

(73) Assignee: Caterpillar Japan Ltd., Tokyo (JP)

( * ) Notice: Subject to any disclaimer, the term of this patent is extended or adjusted under 35 U.S.C. 154(b) by 234 days.

(21) Appl. No.: 11/816,026

(22) PCT Filed: Feb. 27, 2006

(86) PCT No.: PCT/JP2006/303561

§ 371 (c)(1), (2), (4) Date: Aug. 10, 2007

(87) PCT Pub. No.: WO2006/132009

PCT Pub. Date: Dec. 14, 2006

(65) Prior Publication Data

US 2009/0036264 A1 Feb. 5, 2009

(30) Foreign Application Priority Data

| Jun. 6, 2005 | (JP) | ............................. 2005-166175 |
| Jun. 6, 2005 | (JP) | ............................. 2005-166176 |

(51) Int. Cl.
*E02F 5/02* (2006.01)
*F16D 31/02* (2006.01)

(52) U.S. Cl. .......................................... 37/348; 60/421

(58) Field of Classification Search .................. 37/348, 37/379, 435, 443, 414, 466; 60/421–429, 60/468, 430, 562, 533, 581; 91/516, 524, 91/523; 172/2–11; 414/517, 525.6, 516, 414/510, 509, 525.1
See application file for complete search history.

(56) References Cited

U.S. PATENT DOCUMENTS

| 4,898,078 | A | * | 2/1990 | Gage et al. ..................... 91/524 |
| 6,079,933 | A | * | 6/2000 | Moyna et al. ................. 414/517 |
| 6,321,535 | B2 | * | 11/2001 | Ikari et al. ..................... 60/421 |
| 6,658,843 | B1 | * | 12/2003 | Kauss .......................... 60/468 |
| 7,251,934 | B2 | * | 8/2007 | Lech et al. ..................... 60/430 |

FOREIGN PATENT DOCUMENTS

| JP | 09-079212 | 3/1997 |
| JP | 2000-046165 | 2/2000 |
| JP | 2001-207482 | 8/2001 |
| JP | 2001-304001 | 10/2001 |
| JP | 2004-190845 A | 7/2004 |

* cited by examiner

*Primary Examiner*—Robert E Pezzuto
(74) *Attorney, Agent, or Firm*—Darby & Darby P.C.

(57) ABSTRACT

A work machine enabling a hybrid drive system to be directly driven by energy contained in a return fluid discharged from a hydraulic actuator. The work machine includes a hydraulic actuator control circuit and a swing control circuit. The hydraulic actuator control circuit serves to control hydraulic fluid supplied from pumps of a hybrid drive system to travel motors and work actuators. The swing control circuit serves to control a swing motor generator, which functions as an electric motor and, during braking of rotating motion of the upper structure, functions as a generator. The hydraulic actuator control circuit includes an energy recovery motor provided in a return passage, though which return fluid recovered from a work actuator flows. The energy recovery motor is adapted to be driven by return fluid and thereby drive a motor generator of the hybrid drive system.

8 Claims, 4 Drawing Sheets

WORK MACHINE

CROSS REFERENCE TO RELATED APPLICATIONS

This is a U.S. national phase application under 35 U.S.C. § 371 of International Patent Application No. PCT/JP2006/303561, filed Feb. 27, 2006 and claims the benefit of Japanese Application Nos. 2005-166175 filed Jun. 6, 2005 and 2005-166176, filed Jun. 6, 2005. The International Application was published in Japanese on Dec. 14, 2006 as International Publication No. WO/2006/132009 under PCT Article 21(2) the content of which are incorporated herein in their entirety.

TECHNICAL FIELD

The present invention relates to a work machine provided with a hybrid drive system.

BACKGROUND ART

A driving system for a work machine, such as a hydraulic excavator, may include a hybrid drive system that has an electric generator, which is adapted to be driven by an engine, and an electric power storage device for storing electric power generated by the generator. A hydraulic actuator control circuit for a boom cylinder, a stick cylinder, and a bucket cylinder, etc. includes an electric motor or a motor generator, as well as a pump or a pump motor to be driven by the electric motor or the motor generator. The aforementioned electric motor or motor generator is operated by power supplied from either one of or both the generator and the electric power storage device of the hybrid drive system. For example, a boom cylinder control circuit may include a bi-directional type pump motor and a motor generator. The bi-directional type pump motor is adapted to function as a pump for feeding hydraulic fluid and also function as a hydraulic motor driven by hydraulic fluid fed thereto. The motor generator is adapted to be driven by electric power supplied from the generator or the electric power storage device so as to function as an electric motor for driving the pump motor and also adapted to be driven by the pump motor so as to function as a generator for generating electric power (e.g. Japanese Laid-open Patent Publication No. 2004-190845 (page 7, and FIG. 1)).

SUMMARY OF THE INVENTION

The aforementioned boom cylinder control circuit comprises a combination of a pump motor and a motor generator, so that electric power generated by the boom cylinder control circuit is stored in the electric power storage device of the hybrid drive system. As excess energy contained in hydraulic fluid is thus transformed in the hydraulic actuator control circuit into electric power and stored in a the electric power storage device of the hybrid drive system, it is necessary to provide an electric-power generation means in the hydraulic actuator control circuit.

In order to solve the above problem, an object of the invention is to provide a work machine where an electric-power generation means in a hydraulic actuator control circuit is made unnecessary by enabling a hybrid drive system to be directly driven by energy contained in a return fluid discharged from a hydraulic actuator.

The present invention relates to a work machine including a lower structure adapted to be driven by a travel motor, an upper structure that is rotatable on the lower structure by a swing motor generator, and a work equipment that is mounted on the upper structure and adapted to be operated by a work actuator, wherein the work machine further includes a hybrid drive system, a hydraulic actuator control circuit, and a swing control circuit. The hybrid drive system has an engine, a motor generator, an electric power storage device, and a pump. The motor generator is adapted to be driven by the engine so as to function as a generator as well as receive electric power so as to function as an electric motor. The electric power storage device serves to store electric power fed from the motor generator functioning as a generator, as well as feed electric power to the motor generator functioning as an electric motor. The pump is adapted to be driven either one of or both the engine and the motor generator. The hydraulic actuator control circuit serves to control hydraulic fluid fed from the pump of the hybrid drive system to the travel motor and the work actuator. The swing control circuit serves to feed electric power from the electric power storage device of the hybrid drive system to the aforementioned swing motor generator so that the swing motor generator functions as an electric motor. Another function of the swing control circuit is to recover electric power generated by the swing motor generator functioning as a generator to the electric power storage device during braking of rotating motion of the upper structure. The hydraulic actuator control circuit further includes an energy recovery motor and a recovery clutch. The energy recovery motor is disposed in a return fluid passage through which return fluid recovered from the work actuator flows. The energy recovery motor is adapted to be driven by return fluid and thereby drive the motor generator of the hybrid drive system. The recovery clutch is disposed between the energy recovery motor and the motor generator of the hybrid drive system and serves to enable or interrupt transmission of rotational power.

The present invention relates to a work machine, wherein the return fluid passage includes a return passage provided with the aforementioned energy recovery motor, another return passage that branches off the upstream side of the energy recovery motor, and a flow rate ratio control valve for controlling a flow rate ratio of a flow rate in the first mentioned return passage and a flow rate in the other return passage.

The present invention relates to a work machine, wherein the work equipment includes a boom, a stick, and a bucket, which are sequentially connected; the work machine includes a plurality of work actuators that comprises a boom cylinder for pivoting the boom, a stick cylinder for pivoting the stick, and a bucket cylinder for pivoting the bucket; and the energy recovery motor is disposed in a return fluid passage provided for return fluid from the boom cylinder.

The present invention relates to a work machine wherein the hybrid drive system includes a plurality of pumps, and the hydraulic actuator control circuit further includes a boom cylinder hydraulic fluid feeding passage, a stick cylinder hydraulic fluid feeding passage, a boom-to-stick solenoid valve, and a stick-to-boom solenoid valve. The boom cylinder hydraulic fluid feeding passage is provided for feeding hydraulic fluid from one of the pumps to the boom cylinder. The stick cylinder hydraulic fluid feeding passage serves to feed hydraulic fluid from another pump to the stick cylinder. The boom-to-stick solenoid valve is adapted to be moved between a position for enabling the hydraulic fluid to flow from the boom cylinder hydraulic fluid feeding passage to the stick cylinder hydraulic fluid feeding passage and a position for interrupting the flow of fluid. The stick-to-boom solenoid valve is adapted to be moved between a position for enabling the hydraulic fluid to flow from the stick cylinder hydraulic fluid feeding passage to the head-side of the boom cylinder and a position for interrupting the flow of fluid.

The present invention relates to a work machine including a lower structure adapted to be driven by a travel motor, an upper structure that is rotatable on the lower structure by a swing motor generator, and a work equipment that is mounted on the upper structure and adapted to be operated by a work actuator, wherein the work machine further includes a hybrid drive system, a hydraulic actuator control circuit, and a swing control circuit. The hybrid drive system comprises an engine, a motor generator, an electric power storage device, and a pump. The motor generator is adapted to be driven by the engine so as to function as a generator as well as receive electric power so as to function as an electric motor. The electric power storage device serves to store electric power fed from the motor generator functioning as a generator, as well as feed electric power to the motor generator functioning as an electric motor. The pump is adapted to be driven either one of or both the engine and the motor generator. The hydraulic actuator control circuit serves to control hydraulic fluid fed from the pump of the hybrid drive system to the travel motor and the work actuator. The swing control circuit serves to feed electric power from the electric power storage device of the hybrid drive system to the aforementioned swing motor generator so that the swing motor generator functions as an electric motor. Another function of the swing control circuit is to recover electric power generated by the swing motor generator functioning as a generator to the electric power storage device during braking of rotating motion of the upper structure. The hydraulic actuator control circuit further includes an energy recovery motor disposed in a return fluid passage through which return fluid discharged from the work actuator flows. The energy recovery motor is adapted to be driven by return fluid and thereby drive the motor generator of the hybrid drive system. The hybrid drive system further includes an engine and a power transmission unit. The engine clutch serves to enable or interrupt transmission of rotational power output from the engine. The power transmission unit serves to transmit engine rotation that has been transmitted to the power transmission unit through the engine clutch to the pump and the motor generator. Another function of the power transmission unit is to transmit rotation of the motor generator to the pump.

The present invention relates to a work machine, wherein the hybrid drive system further includes a starter motor generator connected in series to the engine. The starter motor generator is adapted to receive electric power to start up the engine, as well as be driven by the engine to generate electric power.

The present invention relates to a work machine, wherein the hybrid drive system further includes a motor generator clutch that is disposed between the motor generator and the power transmission unit and serves to enable or interrupt transmission of rotational power.

The present invention relates to a work machine, wherein the work machine further includes a recovery clutch that is disposed between the energy recovery motor and the motor generator of the hybrid drive system and serves to enable or interrupt transmission of rotational power.

According to the present invention, the energy recovery motor provided in the return fluid passage through which return fluid recovered from the work actuator of the hydraulic actuator control circuit flows directly drives the motor generator of the hybrid drive system through the recovery clutch, making it unnecessary for the excess energy of the hydraulic fluid to be transformed in the hydraulic actuator control circuit into electric power. Therefore, the configuration described above eliminates the necessity of providing a generator means in the hydraulic actuator control circuit and also improves energy efficiency. Furthermore, to stop the upper structure when it is being rotated on the lower structure by the swing motor generator functioning as an electric motor, the swing control circuit operates the swing motor generator to function as a generator. Thus, the rotation of the upper structure can be braked, while the electric power generated by the swing motor generator, together with the electric power generated by the motor generator driven by the energy recovery motor, can be efficiently recovered to the electric power storage device of the hybrid drive system and effectively regenerated as pump power for the hybrid drive.

According to the present invention, the return fluid discharged from the boom cylinder into the return fluid passage branches off into a return passage and another return passage; the proportion of divided flows of the fluid is controlled by the flow rate ratio control valve; and the return fluid in one of the divided flows, whose flow rate is controlled by the flow rate ratio control valve, drives the energy recovery motor. Therefore, the configuration according to the present invention is capable of gradually increasing the flow rate proportion of the fluid distributed towards the energy recovery motor from the moment when return fluid starts to flow from the boom cylinder, thereby preventing occurrence of shock, as well as ensuring stable function of the boom cylinder by preventing a sudden change in load to the boom cylinder.

According to the present invention, when operating the work actuators by means of hydraulic fluid fed from the pump of the hybrid drive system, engaging the recovery clutch enables the hydraulic actuator control circuit to operate the energy recovery motor using return fluid discharged from the boom cylinder so that the energy recovery motor effectively inputs driving power to the motor generator of the hybrid drive system, thereby storing the generated electric power in the electric power storage device. The hydraulic actuator control circuit is also designed in such a way that when the motor generator of the hybrid drive system is used as an electric motor, disengaging the recovery clutch prevents the energy recovery motor from applying a load to the motor generator, thereby ensuring the efficient functioning of the motor generator as an electric motor by electric power fed from the electric power storage device of the hybrid drive system.

According to the present invention, opening the boom-to-stick solenoid valve and closing the stick-to-boom solenoid valve enables hydraulic fluid that would otherwise be fed from one of the pumps to the boom cylinder to merge with the hydraulic fluid fed from another pump to the stick cylinder, thereby increasing the speed of the stick cylinder. Closing the boom-to-stick solenoid valve and opening the stick-to-boom solenoid valve enables the hydraulic fluid that would otherwise be fed from the second mentioned pump to the stick cylinder to merge with the hydraulic fluid that is fed from the first mentioned pump to the head-side of the boom cylinder, speeding up the boom raising action.

According to the present invention, the energy recovery motor provided in the return fluid passage through which return fluid discharged from the work actuator of the hydraulic actuator control circuit flows directly drives the motor generator of the hybrid drive system, making it unnecessary for the excess energy of the hydraulic fluid to be transformed in the hydraulic actuator control circuit into electric power. Therefore, the configuration described above eliminates the necessity of providing a generator means in the hydraulic actuator control circuit. Disengaging the engine clutch enables the motor generator to be run as an electric motor by the electric power stored in the electric power storage device, thereby operating the pump in a still environment where the engine is in a stopped state. Furthermore, to stop the upper structure when it is being rotated on the lower structure by the swing motor generator functioning as an electric motor, the swing control circuit operates the swing motor generator to function as a generator. Thus, the rotation of the upper structure can be braked, while the electric power generated by the swing motor generator, together with the electric power generated by the motor generator driven by the energy recovery motor, can be efficiently recovered to the electric power storage device of the hybrid drive system and effectively regenerated as pump power for the hybrid drive system.

According to the present invention, wherein a series system, in which the engine and the starter motor generator are connected in series, and a parallel system, in which the engine and the motor generator are both connected with the power transmission unit in parallel, are provided, selection can be made between the series system and the parallel system by means of the engine clutch, which is provided between the engine and the power transmission unit. This configuration enables the use of the merits of the two systems, depending on the work. For example, disengaging the engine clutch enables the motor generator to be run as an electric motor by the electric power stored in the electric power storage device, thereby operating the pump in a still environment where the engine is in a stopped state. It is also possible to obtain a great pump power by engaging the engine clutch to simultaneously use the driving power of the engine and the driving power of the motor generator through the power transmission unit. The starter motor generator, which is connected in series to the engine, is capable of functioning as an electric motor to start up the engine, and, when the load applied to the engine is small, functioning as a generator that is driven by the engine. Furthermore, by disengaging the engine clutch, it is possible to drive the starter motor generator to function as a generator independently of the hydraulic system so that the electric power storage device can be efficiently charged by both the starter motor generator and the motor generator.

According to the present invention, wherein a series system, in which the engine and the starter motor generator are connected in series, and a parallel system, in which the engine and the motor generator are both connected with the power transmission unit in parallel, are provided, selection can be made between the series system and the parallel system by means of the engine clutch and the motor generator clutch. This configuration enables the use of the merits of the two systems, depending on the work. For example, disengaging the engine clutch and engaging the motor generator clutch enables the motor generator to be run as an electric motor by the electric power stored in the electric power storage device, thereby operating the pump in a still environment where the engine is in a stopped state. It is also possible to obtain a great pump power by engaging both the engine clutch and the motor generator clutch to simultaneously use the driving power of the engine and the driving power of the motor generator through the power transmission unit. Furthermore, by engaging the engine clutch and disengaging the motor generator clutch, the operation efficiency of the series system is improved, because the motor generator does not place a load on the engine. The starter motor generator, which is connected in series to the engine, is capable of functioning as an electric motor to start up the engine, and, when the load applied to the pump is small, functioning as a generator that is driven by the engine. Furthermore, by disengaging the engine clutch, it is possible to drive the starter motor generator to function as a generator independently of the hydraulic system so that the electric power storage device can be efficiently charged by both the starter motor generator and the motor generator.

According to the present invention, when controlling hydraulic fluid fed from the pump of the hybrid drive system to the work actuator, engaging the recovery clutch enables the hydraulic actuator control circuit to operate the energy recovery motor using return fluid discharged from the work actuator so that the energy recovery motor effectively inputs driving power to the motor generator of the hybrid drive system, thereby storing the generated electric power in the electric power storage device. The hydraulic actuator control circuit is also designed in such a way that when the motor generator of the hybrid drive system is used as an electric motor, disengaging the recovery clutch prevents the energy recovery motor from applying a load to the motor generator, thereby ensuring the efficient functioning of the motor generator as an electric motor by electric power fed from the electric power storage device of the hybrid drive system.

DETAILED DESCRIPTION THE INVENTION

Figure 1:
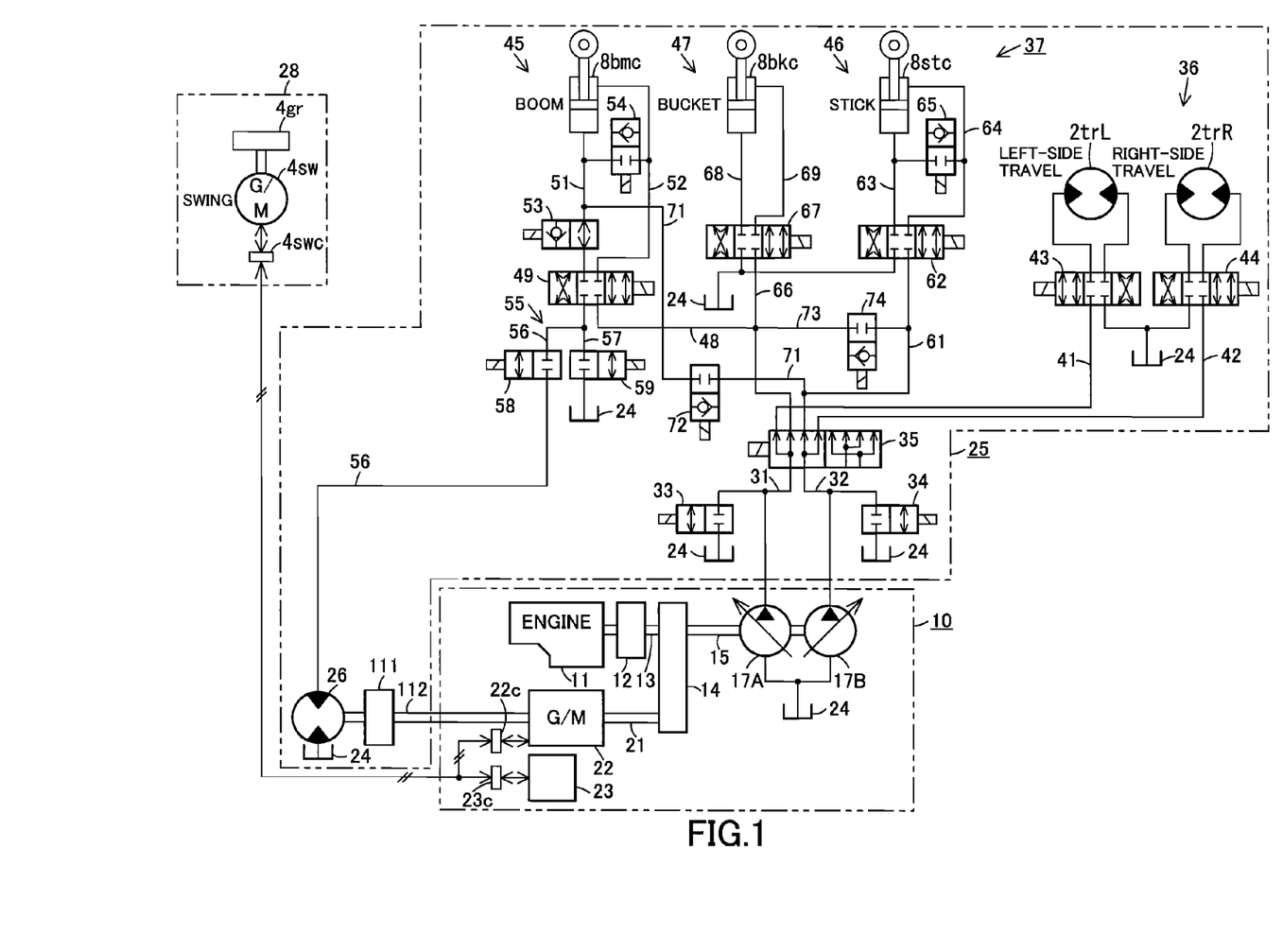
FIG. 1 is a circuit diagram showing a hybrid drive system and a hydraulic actuator control circuit of a work machine according to an embodiment of the present invention.
Figure 2:
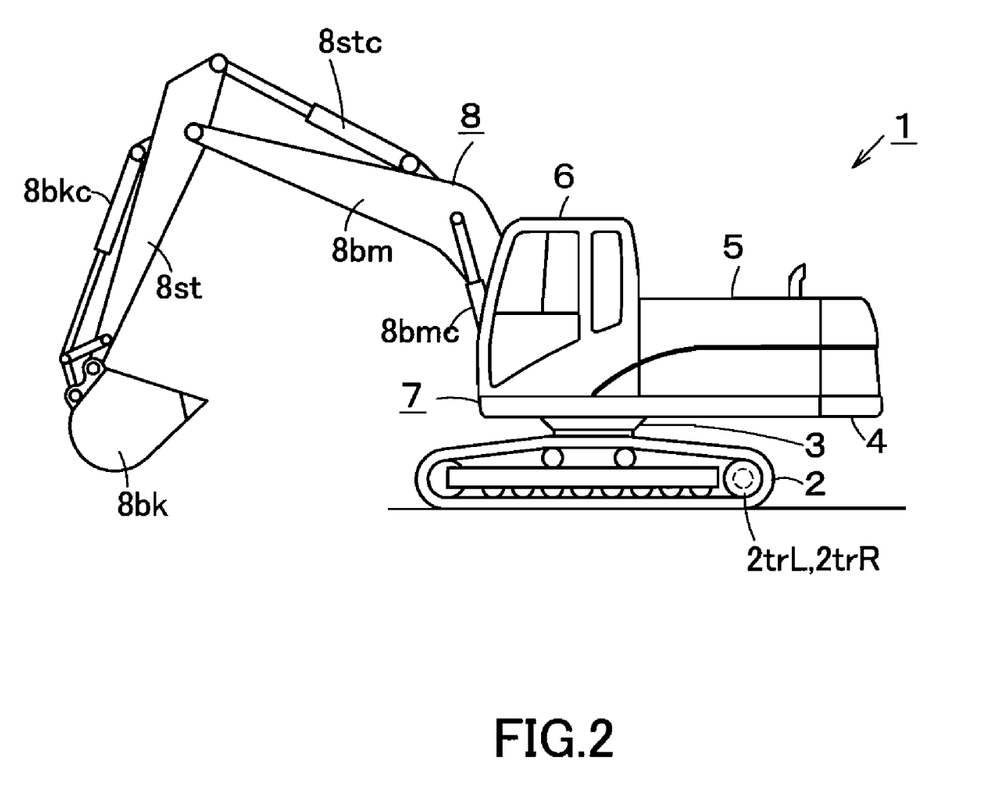
FIG. 2 is a side view of the aforementioned work machine.
Figure 3:
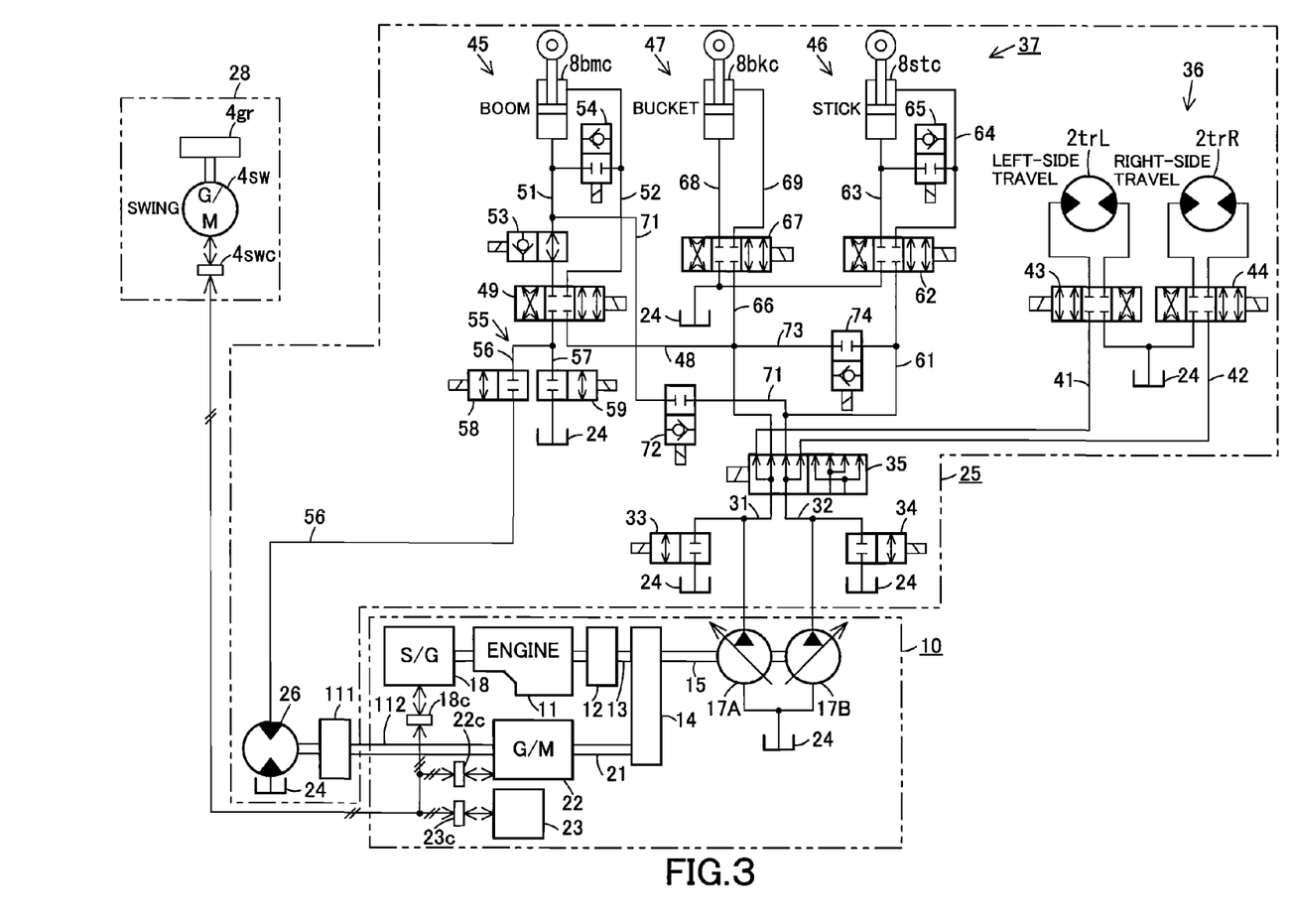
FIG. 3 is a circuit diagram showing a hybrid drive system and a hydraulic actuator control circuit of a work machine according to another embodiment of the present invention.
Figure 4:
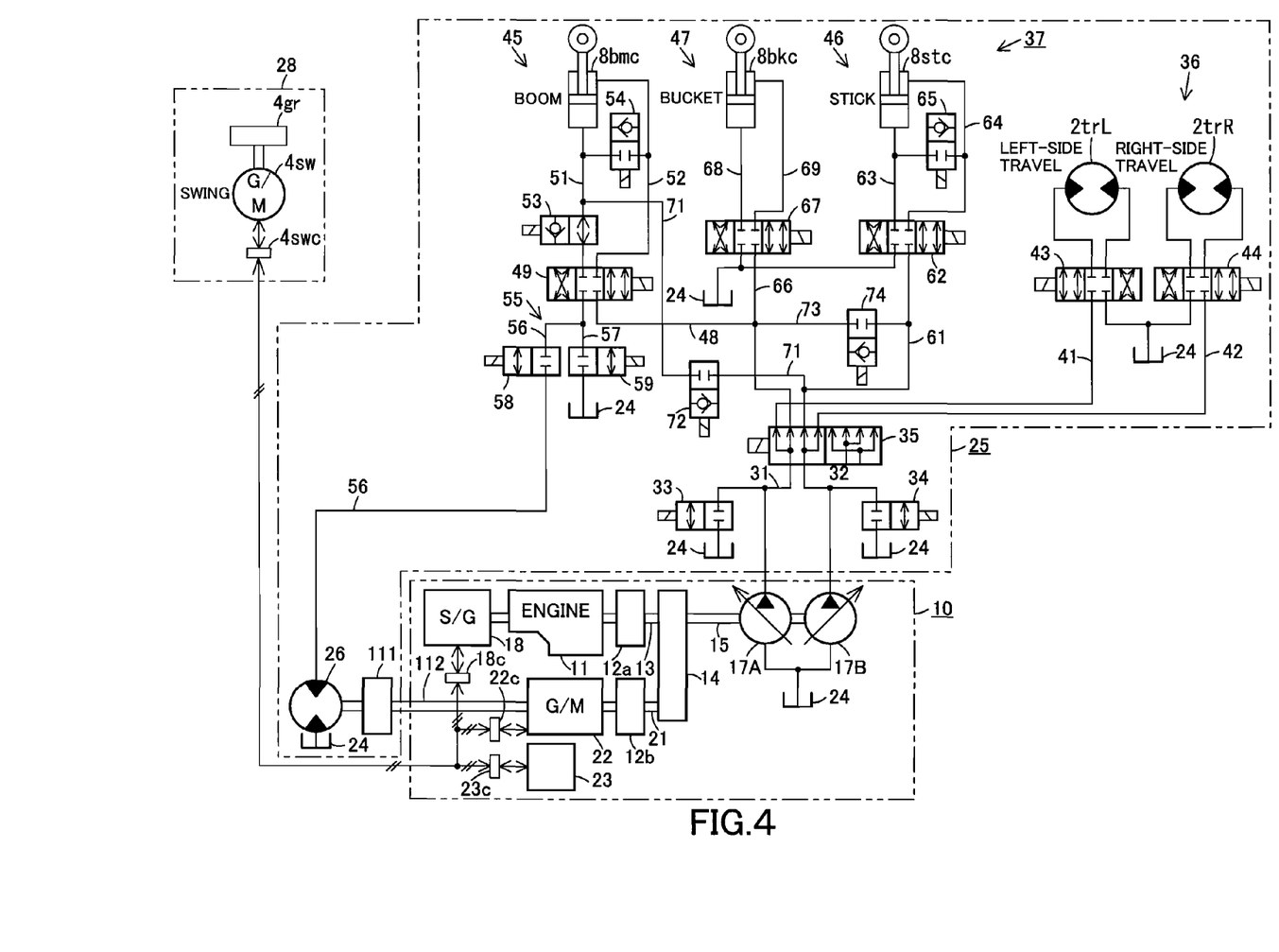
FIG. 4 is a circuit diagram showing a hybrid drive system and a hydraulic actuator control circuit of a work machine according to a further embodiment of the present invention.

Next, the present invention is explained in detail hereunder, referring to an embodiment thereof shown in FIGS. 1 and 2, another embodiment shown in FIG. 3, and a further embodiment shown in FIG. 4. The fluid and fluid pressure used in those embodiments are oil and oil pressure, respectively.

First, the embodiment shown in FIGS. 1 and 2 is explained.

As shown in FIG. 2, a work machine 1 is a hydraulic excavator that includes a machine body 7. The machine body 7 is comprised of a lower structure 2, an upper structure 4 rotatably mounted on the lower structure 2 with a swing bearing portion 3 therebetween, and components mounted on the upper structure 4. The components mounted on the upper structure 4 include a power unit 5 comprised of an engine, hydraulic pumps, etc., and a cab 6 for protecting an operator. The lower structure 2 is provided with travel motors 2*tr*L, 2*tr*R for respectively driving right and left crawler belts. The upper structure 4 is provided with a swing motor generator (not shown in FIG. 2) for driving a swing deceleration mechanism provided in the swing bearing portion 3.

A work equipment 8 is attached to the upper structure 4. The work equipment 8 comprises a boom 8*bm*, a stick 8*st*, and a bucket 8*bk* that are connected sequentially as well as pivotally by means of pins, wherein the boom 8*bm* is attached to a bracket (not shown) of the upper structure 4 by means of pins. The boom 8*bm*, the stick 8*st*, and the bucket 8*bk* can be respectively pivoted by means of a boom cylinder 8*bmc*, a stick cylinder 8*stc*, and a bucket cylinder 8*bkc*, each of which serves as a work actuator.

A hybrid drive system 10 shown in FIG. 1 comprises an engine 11, an engine clutch 12, a power transmission unit 14, and two pumps 17A,17B of a variable delivery type. The engine clutch 12 is connected to the engine 11 and serves to enable or interrupt transmission of rotational power output from the engine 11. An input axis 13 of the power transmission unit 14 is connected to the engine clutch 12, and the pumps 17A,17B are connected to an output axis 15 of the power transmission unit 14.

A motor generator 22 is connected to an input/output axis 21 of the power transmission unit 14 so that the motor generator 22 is arranged in parallel with the engine 11 with respect to the pumps 17A,17B. The motor generator 22 is adapted to be driven by the engine 11 so as to function as a generator as well as receive electric power so as to function as an electric motor. The motor power of the motor generator 22 is set to be smaller than the engine power. A motor generator controller 22c, which may be an inverter or the like, is connected to the motor generator 22.

An electric power storage device 23, which may be a battery, a capacitor, or the like, is connected to the motor generator controller 22c through an electric power storage device controller 23c, which may be a converter or the like. The electric power storage device 23 serves to store electric power fed from the motor generator 22 functioning as a generator, as well as feed electric power to the motor generator 22 functioning as a motor.

The power transmission unit 14 of the hybrid drive system 10 incorporates a continuously variable transmission mechanism, such as a toroidal type, a planetary gear type, etc., so that, upon receiving a control signal from outside, the power transmission unit 14 is capable of outputting rotation of continuously varying speed to its output axis 15.

The pumps 17A,17B of the hybrid drive system 10 serve to feed hydraulic fluid, such as hydraulic oil, that is contained in a tank 24 to a hydraulic actuator control circuit 25. The hydraulic actuator control circuit 25 includes an energy recovery motor 26, to which the aforementioned motor generator 22 of the hybrid drive system 10 is connected through a recovery clutch 111 and a rotary shaft 112. The recovery clutch 111 serves to enable or interrupt transmission of rotational power.

A swing control circuit 28 is provided separately and independently from the hydraulic actuator control circuit 25. The swing control circuit 28 serves to feed electric power from the electric power storage device 23 of the hybrid drive system 10 to the aforementioned swing motor generator, which is represented by 4sw in FIG. 1, so that the swing motor generator 4sw functions as an electric motor. Another function of the swing control circuit 28 is to recover to the electric power storage device 23 electric power generated by the swing motor generator 4sw functioning as a generator during braking of rotating motion of the upper structure 4.

The swing control circuit 28 includes the aforementioned swing motor generator 4sw and a swing motor generator controller 4swc, which may be an inverter or the like. The swing motor generator 4sw serves to rotate the upper structure 4 through a swing deceleration mechanism 4gr. The swing motor generator 4sw is adapted to be driven by electric power fed from the electric power storage device 23 of the hybrid drive system 10 so as to function as an electric motor. The swing motor generator 4sw is also adapted to function as a generator when being rotated by inertial rotation force so as to recover electric power to the electric power storage device 23.

Speed of the engine 11, engagement/disengagement by the engine clutch 12, and speed change by the power transmission unit 14 are controlled based on signals output from a controller (not shown).

As shown in FIG. 1, the hydraulic actuator control circuit 25 includes pump passages 31,32, which are respectively connected to output ports of the pumps 17A,17B. The pump passages 31,32 are also respectively connected to solenoid valves 33,34, which serve as proportional solenoid valves, as well as to a solenoid valve 35, which is adapted to function as a straight travel valve. The solenoid valves 33,34 are respectively disposed in bypass passages for returning hydraulic fluid to the tank 24.

Each solenoid valve 33,34 may function as a bypass valve. To be more specific, when there is no operating signal that signifies the operator operating any one of the corresponding hydraulic actuators 2trL,2trR,8bmc,8stc,8bkc, a control signal from the controller controls the valve to a fully open position so that the corresponding pump passage 31,32 communicates with the tank 24. When the operator operates any hydraulic actuator 2trL,2trR,8bmc,8stc,8bkc, the corresponding solenoid valve 33,34 moves to a closed position in proportion to the magnitude of the operating signal.

When at the left position as viewed in FIG. 1, i.e. the work position, the solenoid valve 35 enables hydraulic fluid to be fed from the two pumps 17A,17B to the hydraulic actuators 2trL,2trR,8bmc,8stc,8bkc. When the solenoid valve 35 is switched to the right position, i.e. the straight travel position, it permits one of the pumps, i.e. the pump 17B, which may also be referred to as the second pump, to feed equally divided volume of hydraulic fluid to the two travel motors 2trL,2trR, thereby enabling the work machine 1 to travel straight.

The hydraulic actuator control circuit 25 includes a travel control circuit 36 and a work equipment control circuit 37. The travel control circuit 36 serves to control hydraulic fluid fed from the pumps 17A,17B of the hybrid drive system 10 to the travel motors 2trL,2trR. The work equipment control circuit 37 serves to control hydraulic fluid fed from the pumps 17A,17B of the hybrid drive system 10 to the work actuators 8bmc,8stc,8bkc, which serve to operate the work equipment 8.

The travel control circuit 36 includes solenoid valves 43,44 for controlling direction and flow rate of hydraulic fluid supplied respectively through travel motor hydraulic fluid feeding passages 41,42. The travel motor hydraulic fluid feeding passages 41,42 are drawn from the solenoid valve 35, which functions as a straight travel valve.

The work equipment control circuit 37 includes a boom control circuit 45, a stick control circuit 46, and a bucket control circuit 47. The boom control circuit 45 serves to control hydraulic fluid fed from the pumps 17A,17B of the hybrid drive system 10 to the boom cylinder 8bmc. The stick control circuit 46 serves to control hydraulic fluid fed from the pumps 17A,17B of the hybrid drive system 10 to the stick cylinder 8stc. The bucket control circuit 47 serves to control hydraulic fluid fed from the pumps 17A,17B of the hybrid drive system 10 to the bucket cylinder 8bkc.

The boom control circuit 45 includes a solenoid valve 49 for controlling direction and flow rate of hydraulic fluid supplied through a boom cylinder hydraulic fluid feeding passage 48. The boom cylinder hydraulic fluid feeding passage 48 is drawn from the solenoid valve 35, which functions as a straight travel valve. The solenoid valve 49 is provided with hydraulic fluid feed/discharge passages 51,52, which respectively communicate with the head-side chamber and the rod-side chamber of the boom cylinder 8bmc.

A solenoid valve 53 that serves as a fall preventive valve is included in the head-side hydraulic fluid feed/discharge passage 51 so that when movement of the boom 8bm is stopped, the boom 8bm is prevented from descending due to its own weight by switching the solenoid valve 53 to a check valve position at the left side, at which the solenoid valve 53 functions as a check valve. A solenoid valve 54 that serves as a regeneration valve is disposed between the two hydraulic fluid feed/discharge passages 51,52 so that a part of return fluid discharged from the head-side chamber of the boom cylinder 8*bmc* can be regenerated into the rod-side chamber by switching the solenoid valve 54 to the check valve position when the boom is lowered.

A return fluid passage 55 that permits the fluid discharged from the boom cylinder 8*bmc* to branch off is provided at the tank passage side of the solenoid valve 49. The return fluid passage 55 comprises two return passages 56,57, which are provided with a flow rate ratio control valve 58,59 for controlling a ratio of fluid that branches off into the return passages 56,57. The flow rate ratio control valve 58,59 is comprised of two flow control solenoid valves: a solenoid valve 58 disposed in the return passage 56, which is provided with the aforementioned energy recovery motor 26, and a solenoid valve 59 disposed in the return passage 57, which branches off the upstream side of the solenoid valve 58.

When the energy recovery motor 26 is in operation, its rotation speed is controlled by the flow rate of return fluid in the return passage 56, the aforementioned flow rate being controlled by the flow rate ratio control valve 58,59.

It is desirable for the energy recovery motor 26 to function when the solenoid valve 49, which is provided for controlling direction and flow rate of hydraulic fluid, is positioned at the right chamber position as viewed in FIG. 1. In other words, it is desirable that when the boom is lowered, the hydraulic fluid feed/discharge passage 51 at the head-side of the boom cylinder 8*bmc* communicate with the return fluid passage 55 so as to permit the return fluid discharged from the head-side of the boom cylinder 8*bmc* to drive the energy recovery motor 26 well within its capacity because of the dead weight of the boom.

The stick control circuit 46 includes a solenoid valve 62 for controlling direction and flow rate of hydraulic fluid supplied through a stick cylinder hydraulic fluid feeding passage 61. The stick cylinder hydraulic fluid feeding passage 61 is drawn from the solenoid valve 35, which functions as a straight travel valve. The solenoid valve 62 is provided with hydraulic fluid feed/discharge passages 63,64, which respectively communicate with the head-side chamber and the rod-side chamber of the stick cylinder 8*stc*. A solenoid valve 65 that serves as a regeneration valve for returning fluid from the rod side to the head side is disposed between the two hydraulic fluid feed/discharge passages 63,64 so that return fluid discharged from the rod-side chamber of the stick cylinder 8*stc* can be regenerated into the head-side chamber by switching the solenoid valve 65 to the check valve position when the stick is lowered by stick-in operation.

The bucket control circuit 47 includes a solenoid valve 67 for controlling direction and flow rate of hydraulic fluid supplied through a bucket cylinder hydraulic fluid feeding passage 66. The bucket cylinder hydraulic fluid feeding passage 66 is drawn from the solenoid valve 35, which functions as a straight travel valve. The solenoid valve 67 is provided with hydraulic fluid feed/discharge passages 68,69, which respectively communicate with the head-side chamber and the rod-side chamber of the bucket cylinder 8*bkc*.

A circuit-to-circuit communicating passage 71 from stick to boom is disposed between the stick cylinder hydraulic fluid feeding passage 61 and the head-side of the boom cylinder 8*bmc* and thereby provides fluid communication between them. A stick-to-boom solenoid valve 72 is disposed in the circuit-to-circuit communicating passage 71 from stick to boom. The stick-to-boom solenoid valve 72 is adapted to be moved between a position for enabling flow in one direction from the stick cylinder hydraulic fluid feeding passage 61 to the head-side of the boom cylinder 8*bmc* and a position for interrupting the flow of fluid.

A circuit-to-circuit communicating passage 73 from boom to stick is disposed between the boom cylinder hydraulic fluid feeding passage 48 and the stick cylinder hydraulic fluid feeding passage 61 and thereby provides fluid communication between them. A boom-to-stick solenoid valve 74 is disposed in the circuit-to-circuit communicating passage 73 from boom to stick. The boom-to-stick solenoid valve 74 is adapted to be moved between a position for enabling flow in one direction from the boom cylinder hydraulic fluid feeding passage 48 to the stick cylinder 8*stc* and a position for interrupting the flow of fluid.

Each one of the solenoid valves 53,54,65,72,74 is a selector valve that incorporates a check valve and is capable of controlling flow rate.

Each one of the solenoid valves 33,34,35,43,44,49,53,54, 58,59,62,65,67,72,74 has a return spring (not shown) and a solenoid that is adapted to be proportionally controlled by the controller (not shown) so that each solenoid valve is controlled to a position to achieve a balance between excitation force of the solenoid and restorative force of the spring.

Next, the operations and effects of the embodiment shown in FIGS. 1 and 2 are explained hereunder.

With the configuration as above, the energy recovery motor 26 provided in the return passage 56, through which return fluid discharged from the boom cylinder 8*bmc* of the hydraulic actuator control circuit 25 flows, directly drives the motor generator 22 of the hybrid drive system 10 through the recovery clutch 111, making it unnecessary for the excess energy of the hydraulic fluid to be transformed in the hydraulic actuator control circuit 25 into electric power. Therefore, the embodiment described above eliminates the necessity of providing a generator means in the hydraulic actuator control circuit 25.

Disengaging the engine clutch 12 enables the motor generator 22 to be run as an electric motor by the electric power stored in the electric power storage device 23, thereby operating the pumps 17A,17B in a still environment where the engine 11 is in a stopped state.

Furthermore, to stop the upper structure 4 when it is being rotated on the lower structure 2 by the swing motor generator 4*sw* functioning as an electric motor, the swing control circuit 28 operates the swing motor generator 4*sw* to function as a generator. Thus, the rotation of the upper structure 4 can be braked, while the electric power generated by the swing motor generator 4*sw*, together with the electric power generated by the motor generator 22 of the hybrid drive system 10, which is being driven by the energy recovery motor 26 through the recovery clutch 111, can be efficiently recovered to the electric power storage device 23 and effectively regenerated as pump power for the hybrid drive system 10.

At the return fluid passage 55, the boom control circuit 45 of the work equipment control circuit 37 divides the return fluid discharged from the boom cylinder 8*bmc*, controls the proportion of divided flows of the fluid by the flow rate ratio control valve 58,59, and, by means of the return fluid in one of the divided flows, whose flow rate is controlled by the flow rate ratio control valve 58,59, drives the energy recovery motor 26 so that the energy recovery motor 26 drives the motor generator 22 of the hybrid drive system 10 through the recovery clutch 111. With the configuration as above, the boom control circuit 45 is capable of gradually increasing the flow rate proportion of the fluid distributed towards the energy recovery motor 26 from the moment when return fluid starts to flow from the boom cylinder 8*bmc*, thereby preventing occurrence of shock, as well as ensuring stable function of the boom cylinder 8*bmc* by preventing a sudden change in load to the boom cylinder 8*bmc*.

In other words, when the boom 8*bm* of the work equipment 8 descends due to its own weight, gradual increase of the flow rate proportion of the return fluid distributed from the head side of the boom cylinder 8*bmc* towards the energy recovery motor 26 enables the energy recovery motor 26 to smoothly absorb the energy of the return fluid, and the prevention of a sudden change in load to the boom cylinder 8*bmc* stabilizes the descending action of the boom 8*bm* due to its own weight.

The solenoid valve 58 and the solenoid valve 59 of the flow rate ratio control valve 58,59 may each be disposed at desired, separate locations in the return passage 56 and the return passage 57 respectively. Furthermore, the flow rate ratio control valve 58,59 is capable of controlling return fluid flowing towards the energy recovery motor 26 at a desired flow rate and flow rate ratio by controlling an aperture of each respective return passage 56,57 separately and independently of each other.

Engaging the recovery clutch 111 enables the energy recovery motor 26, which is operated by return fluid discharged from the boom cylinder 8*bmc* of the hydraulic actuator control circuit 25, to directly drive the motor generator 22 of the hybrid drive system 10 through the recovery clutch 111, making it unnecessary for the excess energy of the hydraulic fluid to be transformed in the hydraulic actuator control circuit 25 into electric power. Therefore, the embodiment described above eliminates the necessity of providing a generator means in the hydraulic actuator control circuit 25 and improves energy efficiency.

When using the motor generator 22 of the hybrid drive system 10 as an electric motor, disengaging the recovery clutch 111 prevents the energy recovery motor 26 from applying a load to the motor generator 22, enabling the motor generator 22 to efficiently function as an electric motor by means of electric power fed from the electric power storage device 23.

Furthermore, to stop the upper structure 4 when it is being rotated on the lower structure 2 by the swing motor generator 4*sw* functioning as an electric motor, the swing control circuit 28 operates the swing motor generator 4*sw* to function as a generator. Thus, the rotation of the upper structure 4 can be braked, while the electric power generated by the swing motor generator 4*sw*, together with the electric power generated by the motor generator 22 of the hybrid drive system 10, which is being driven by the energy recovery motor 26 through the recovery clutch 111, can be efficiently recovered to the electric power storage device 23 and effectively regenerated as pump power for the hybrid drive system 10.

Furthermore, opening the boom-to-stick solenoid valve 74 and closing the stick-to-boom solenoid valve 72 enables hydraulic fluid that would otherwise be fed from the pump 17A, which may also be referred to as a first pump, to the boom cylinder 8*bmc* to merge with the hydraulic fluid fed from the pump 17B, which may also be referred to as a second pump, to the stick cylinder 8*stc*, thereby increasing the speed of the stick cylinder 8*bstc*. Closing the boom-to-stick solenoid valve 74 and opening the stick-to-boom solenoid valve 72 enables the hydraulic fluid that would otherwise be fed from the second pump 17B to the stick cylinder 8*stc* to merge with the hydraulic fluid that is discharged from the first pump 17A and fed through the boom cylinder hydraulic fluid feeding passage 48 and the left chamber of the solenoid valve 49 to the head-side of the boom cylinder 8*bmc*, speeding up the boom raising action.

Furthermore, controlling the boom-to-stick solenoid valve 74 at the flow interruption position enables the boom control circuit 45 and the stick control circuit 46 to function independently of each other, thereby separating the boom system and the stick system so that pressures in the two systems can be controlled independently of each other.

FIG. 3 shows another embodiment of the invention, wherein the same elements as those of the previous embodiment shown in FIG. 1 are identified with the same reference numerals, explanation of which is omitted hereunder.

An engine clutch 12 is connected to an engine 11 and serves to enable or interrupt transmission of rotational power output from the engine 11. An input axis 13 of a power transmission unit 14 is connected to the engine clutch 12. A plurality of pumps 17A,17B of a variable delivery type are connected in series to an output axis 15 of a power transmission unit 14.

A starter motor generator 18 is connected in series to the engine 11. The starter motor generator 18 is adapted to be driven by the engine 11 so as to function as a generator as well as receive electric power so as to function as an electric motor to start up the engine 11. A starter motor generator controller 18*c*, which may be an inverter or the like, is connected to the starter motor generator 18.

A motor generator 22 is connected to an input/output axis 21 of the power transmission unit 14 so that the motor generator 22 is arranged in parallel with the engine 11 with respect to the pumps 17A,17B. The motor generator 22 is adapted to be driven by the engine 11 so as to function as a generator as well as receive electric power so as to function as an electric motor. The motor power of the motor generator 22 is set to be smaller than the engine power. A motor generator controller 22*c*, which may be an inverter or the like, is connected to the motor generator 22.

The starter motor generator controller 18*c* and the motor generator controller 22*c* are connected to an electric power storage device 23, which may be a battery, a capacitor, or the like, through an electric power storage device controller 23*c*, which may be a converter or the like. The electric power storage device 23 serves to store electric power fed from the starter motor generator 18 and the motor generator 22 respectively functioning as generators, as well as feed electric power to the starter motor generator 18 and the motor generator 22 respectively functioning as motors.

The power transmission unit 14 of the hybrid drive system 10 incorporates a continuously variable transmission mechanism, such as a toroidal type, a planetary gear type, etc., so that, upon receiving a control signal from outside, the power transmission unit 14 is capable of outputting rotation of continuously varying speed to its output axis 15.

The pumps 17A,17B of the hybrid drive system 10 serve to feed hydraulic fluid, such as hydraulic oil, that is contained in a tank 24 to a hydraulic actuator control circuit 25. The hydraulic actuator control circuit 25 includes an energy recovery motor 26 so that when the energy recovery motor 26 drives the motor generator 22 through the recovery clutch 111, electric power recovered by the motor generator controller 22*c* of the motor generator 22 is stored in the electric power storage device 23.

A swing control circuit 28 is provided separately and independently from the hydraulic actuator control circuit 25. The swing control circuit 28 serves to feed electric power from the electric power storage device 23 of the hybrid drive system 10 to a swing motor generator 4*sw* so that the swing motor generator 4*sw* functions as an electric motor. Another function of the swing control circuit 28 is to recover to the electric power storage device 23 electric power generated by the swing motor generator 4*sw* functioning as a generator during braking of rotating motion of the upper structure 4.

The swing control circuit 28 includes the aforementioned swing motor generator 4sw and a swing motor generator controller 4swc, which may be an inverter or the like. The swing motor generator 4sw serves to rotate the upper structure 4 through a swing deceleration mechanism 4gr. The swing motor generator 4sw is adapted to be driven by electric power fed from the electric power storage device 23 of the hybrid drive system 10 so as to function as an electric motor. The swing motor generator 4sw is also adapted to function as a generator when being rotated by inertial rotation force so as to recover electric power to the electric power storage device 23.

Speed of the engine 11, engagement/disengagement by the engine clutch 12, and speed change by the power transmission unit 14 are controlled based on signals output from a controller that is not shown in the drawing.

Next, the operations and effects of the embodiment shown in FIG. 3 are explained hereunder.

The embodiment shown in FIG. 3 has a series system, in which the engine 11 and the starter motor generator 18 are connected in series, and a parallel system, in which the engine 11 and the motor generator 22 are both connected with the power transmission unit 14 in parallel so that, depending on the work, selection can be made between the series system and the parallel system by means of the engine clutch 12, which is provided between the engine 11 and the power transmission unit 14. When the series system is in operation, the engine power is transmitted through the starter motor generator 18 and then stored in the electric power storage device 23. When the parallel system is in operation, the engine power is transmitted through the motor generator 22 and then stored in the electric power storage device 23. This configuration thus enables the use of the merits of the two systems, depending on the work.

For example, during heavy load work imposing a heavy pump load, the pumps 17A,17B can be driven by three power sources by engaging the engine clutch 12 and driving both the starter motor generator 18 and the starter motor generator 22 as electric motors so that the motor power from the starter motor generator 18 is input into a crank shaft of the engine 11 while the motor power from the motor generator 22 is input into the power transmission unit 14.

Should the power required by the pumps 17A,17B be well within the engine power when the series system is in operation, the starter motor generator 18 functions as a generator so that electric power generated by the starter motor generator 18 is stored in the electric power storage device 23. Should the engine power be insufficient to satisfy the power required by the pumps 17A,17B, the starter motor generator 18 functions as an electric motor to supplement the engine 11 with its power. Should this still be insufficient to satisfy the power required by the pumps 17A,17B, the motor generator 22 of the parallel system is operated to function as an electric motor so that the engine 11 is supplemented by the power from the starter motor generator 18 as well as from the motor generator 22.

During light load work imposing a relatively light pump load, the pumps 17A,17B may be driven by the motor generator 22 alone, by disengaging the engine clutch 12, which is provided between the engine 11 and the power transmission unit 14.

Disengaging the engine clutch 12 enables the motor generator 22 to be run as an electric motor by the electric power stored in the electric power storage device 23, thereby operating the pumps 17A,17B in a still environment where the engine 11 is in a stopped state. This feature is advantageous because, for example, should some problems arise with the engine 11, it enables work to be carried out until repairs to the engine 11 can be effected or low-noise operations are required in populated areas or during nighttime, where engine noises would causes problems.

Furthermore, it is possible to charge the electric power storage device 23 during operation of the work machine by operating the engine 11 to drive the starter motor generator 18 as a generator while the motor generator 22 is functioning as an electric motor to drive the pumps 17A,17B with the engine clutch 12 disengaged.

Should there be little or no pump load when the engine clutch 12 is engaged, both the starter motor generator 18 and the motor generator 22 may be driven to function as generators so that the starter motor generator 18 and the motor generator 22 receive the engine power and thereby efficiently charge the electric power storage device 23.

It is also possible to obtain a great pump power by engaging the engine clutch 12 to simultaneously use the driving power of the engine 11 and the driving power of the motor generator 22 through the power transmission unit 14. The starter motor generator 18, which is connected in series to the engine 11, is capable of functioning as an electric motor to start up the engine 11, and, when the load applied to the engine is small, functioning as a generator that is driven by the engine 11. Furthermore, by disengaging the engine clutch 12, it is possible to drive the starter motor generator 18 to function as a generator independently of the hydraulic system so that the electric power storage device 23 can be efficiently charged by both the starter motor generator 18 and the motor generator 22.

The electric power storage device 23 is capable of storing electric power fed from the starter motor generator 18 and the motor generator 22 respectively functioning as generators, as well as storing electric power recovered from the motor generator 22 while the motor generator 22 is being driven through the recovery clutch 111 by the energy recovery motor 26 in the hydraulic actuator control circuit 25. As the electric power storage device 23 is thus capable of receiving a sufficient amount of electric power, it enables the motor generator 22 to drive the pumps for a long period of time while the engine 11 is at a standstill.

Furthermore, to stop the upper structure 4 when it is being rotated on the lower structure 2 by the swing motor generator 4sw functioning as an electric motor, the swing control circuit 28 operates the swing motor generator 4sw to function as a generator. Thus, the rotation of the upper structure 4 can be braked, while the electric power generated by the swing motor generator 4sw, together with the electric power generated by the motor generator 22 of the hybrid drive system 10, which is being driven by the energy recovery motor 26 through the recovery clutch 111, can be efficiently recovered to the electric power storage device 23 of the hybrid drive system 10 and regenerated as pump power for the hybrid drive system 10.

FIG. 4 shows a further embodiment of the invention, wherein the same elements as those of the above embodiment shown in FIG. 1 are identified with the same reference numerals, explanation of which is omitted hereunder.

An engine clutch 12a is connected to an engine 11 and serves to enable or interrupt transmission of rotational power output from the engine 11. An input axis 13 of a power transmission unit 14 is connected to the engine clutch 12a. A plurality of pumps 17A,17B of a variable delivery type are connected in series to an output axis 15 of a power transmission unit 14.

A starter motor generator 18 is connected in series to the engine 11. The starter motor generator 18 is adapted to be driven by the engine 11 so as to function as a generator as well as receive electric power so as to function as an electric motor to start up the engine 11. A starter motor generator controller 18*c*, which may be an inverter or the like, is connected to the starter motor generator 18.

A motor generator clutch 12*b* is connected to an input/output axis 21 of the power transmission unit 14 so that the motor generator clutch 12*b* is arranged in parallel with the engine clutch 12*a* with respect to the power transmission unit 14. A motor generator 22 is connected to the motor generator clutch 12*b* so that the motor generator 22 is arranged in parallel with the engine 11 with respect to the pumps 17A, 17B. The motor generator 22 is adapted to be driven by the engine 11 so as to function as a generator as well as receive electric power so as to function as an electric motor. The motor power of the motor generator 22 is set to be smaller than the engine power. A motor generator controller 22*c*, which may be an inverter or the like, is connected to the motor generator 22.

The starter motor generator controller 18*c* and the motor generator controller 22*c* are connected to an electric power storage device 23, which may be a battery, a capacitor, or the like, through an electric power storage device controller 23*c*, which may be a converter or the like. The electric power storage device 23 serves to store electric power fed from the starter motor generator 18 and the motor generator 22 respectively functioning as generators, as well as feed electric power to the starter motor generator 18 and the motor generator 22 respectively functioning as motors.

The power transmission unit 14 of the hybrid drive system 10 incorporates a continuously variable transmission mechanism, such as a toroidal type, a planetary gear type, etc., so that, upon receiving a control signal from outside, the power transmission unit 14 is capable of outputting rotation of continuously varying speed to its output axis 15.

The pumps 17A,17B of the hybrid drive system 10 serve to feed hydraulic fluid, such as hydraulic oil, that is contained in a tank 24 to a hydraulic actuator control circuit 25. The hydraulic actuator control circuit 25 includes an energy recovery motor 26, to which the aforementioned motor generator 22 of the hybrid drive system 10 is connected through a recovery clutch 111 and a rotary shaft 112. The recovery clutch 111 serves to enable or interrupt transmission of rotational power.

A swing control circuit 28 is provided separately and independently from the hydraulic actuator control circuit 25. The swing control circuit 28 serves to feed electric power from the electric power storage device 23 of the hybrid drive system 10 to a swing motor generator 4*sw* so that the swing motor generator 4*sw* functions as an electric motor. Another function of the swing control circuit 28 is to recover to the electric power storage device 23 electric power generated by the swing motor generator 4*sw* functioning as a generator during braking of rotating motion of the upper structure 4.

The swing control circuit 28 includes the aforementioned swing motor generator 4*sw* and a swing motor generator controller 4*swc*, which may be an inverter or the like. The swing motor generator 4*sw* serves to rotate the upper structure 4 through a swing deceleration mechanism 4*gr*. The swing motor generator 4*sw* is adapted to be driven by electric power fed from the electric power storage device 23 of the hybrid drive system 10 so as to function as an electric motor. The swing motor generator 4*sw* is also adapted to function as a generator when being rotated by inertial rotation force so as to recover electric power to the electric power storage device 23.

Speed of the engine 11, engagement/disengagement by the engine clutch 12*a*, and speed change by the power transmission unit 14 are controlled based on signals output from a controller that is not shown in the drawing.

Next, the operations and effects of the embodiment shown in FIG. 4 are explained hereunder.

The embodiment shown in FIG. 4 has a series system, in which the engine 11 and the starter motor generator 18 are connected in series, and a parallel system, in which the engine 11 and the motor generator 22 are both connected with the power transmission unit 14 in parallel so that, depending on the work, selection can be made between the series system and the parallel system by means of the engine clutch 12*a*, which is provided between the engine 11 and the power transmission unit 14, and the motor generator clutch 12*b*, which is provided between the motor generator 22 and the power transmission unit 14. When the series system is in operation, the engine power is transmitted through the starter motor generator 18 and then stored in the electric power storage device 23. When the parallel system is in operation, the engine power is transmitted through the motor generator 22 and then stored in the electric power storage device 23. This configuration thus enables the use of the merits of the two systems, depending on the work.

For example, during heavy load work imposing a heavy pump load, the pumps 17A,17B can be driven by three power sources by engaging both clutches 12*a*,12*b* and driving both the starter motor generator 18 and the starter motor generator 22 as electric motors so that the motor power from the starter motor generator 18 is input into a crank shaft of the engine 11 while the motor power from the motor generator 22 is input into the power transmission unit 14.

Should the power required by the pumps 17A,17B be well within the engine power when the series system is in operation, the starter motor generator 18 functions as a generator so that electric power generated by the starter motor generator 18 is stored in the electric power storage device 23. Should the engine power be insufficient to satisfy the power required by the pumps 17A,17B, the starter motor generator 18 functions as an electric motor to supplement the engine 11 with its power. Should this still be insufficient to satisfy the power required by the pumps 17A,17B, both clutches 12*a*,12*b* are engaged to enable the motor generator 22 of the parallel system to function as an electric motor so that the engine 11 is supplemented by the power from the starter motor generator 18 as well as from the motor generator 22.

During light load work imposing a relatively light pump load, the pumps 17A,17B may be driven either by the engine 11 by engaging the engine clutch 12*a* and disengaging the motor generator clutch 12*b*, or by the motor generator 22 by engaging the motor generator clutch 12*b* and disengaging the engine clutch 12*a*.

Disengaging the engine clutch 12*a*, which is provided between the engine 11 and the power transmission unit 14, and engaging the motor generator clutch 12*b* enables the motor generator 22 to be run as an electric motor by the electric power stored in the electric power storage device 23, thereby operating the pumps 17A,17B in a still environment where the engine 11 is in a stopped state. This feature is advantageous because, for example, should some problems arise with the engine 11, it enables work to be carried out until repairs to the engine 11 can be effected or low-noise operations are required in populated areas or during nighttime, where engine noises would causes problems.

Furthermore, it is possible to charge the electric power storage device 23 during operation of the work machine by operating the engine 11 to drive the starter motor generator 18 as a generator while the motor generator 22 is functioning as an electric motor to drive the pumps 17A,17B with the engine clutch 12a disengaged and the motor generator clutch 12b engaged.

By engaging the engine clutch 12a and disengaging the motor generator clutch 12b, the engine 11 is enabled to drive the pumps 17A,17B and thereby effectively bear the pump load alone, without being burdened by the motor generator 22.

Should there be little or no pump load when the two clutches 12a,12b are engaged, both the starter motor generator 18 and the motor generator 22 may be driven to function as generators so that the starter motor generator 18 and the motor generator 22 receive the engine power and thereby efficiently charge the electric power storage device 23.

It is also possible to obtain a great pump power by thus engaging the two clutches 12a,12b to simultaneously use the driving power of the engine 11 and the driving power of the motor generator 22 through the power transmission unit 14. The starter motor generator 18, which is connected in series to the engine 11, is capable of functioning as an electric motor to start up the engine 11, and, when the load applied to the engine is small, functioning as a generator that is driven by the engine 11. Furthermore, by disengaging the engine clutch 12a, it is possible to drive the starter motor generator 18 to function as a generator independently of the hydraulic system so that the electric power storage device 23 can be efficiently charged by both the starter motor generator 18 and the motor generator 22.

The electric power storage device 23 is capable of storing electric power fed from the starter motor generator 18 and the motor generator 22 respectively functioning as generators, as well as storing electric power recovered from the motor generator 22 while the motor generator 22 is being driven through the recovery clutch 111 by the energy recovery motor 26 in the hydraulic actuator control circuit 25. As the electric power storage device 23 is thus capable of receiving a sufficient amount of electric power, it enables the motor generator 22 to drive the pumps for a long period of time while the engine 11 is at a standstill.

Furthermore, to stop the upper structure 4 when it is being rotated on the lower structure 2 by the swing motor generator 4sw functioning as an electric motor, the swing control circuit 28 operates the swing motor generator 4sw to function as a generator. Thus, the rotation of the upper structure 4 can be braked, while the electric power generated by the swing motor generator 4sw, together with the electric power generated by the motor generator 22, which is being driven by the energy recovery motor 26 through the recovery clutch 111, can be efficiently recovered to the electric power storage device 23 of the hybrid drive system 10 and regenerated as pump power for the hybrid drive system 10.

Although the present invention is suitable for hydraulic excavators, it is also applicable to other work machines, such as truck cranes.

The invention claimed is:

1. A work machine comprising:
    a lower structure adapted to be driven by a travel motor;
    an upper structure that is rotatable on the lower structure by a swing motor generator; and
    a work equipment that is mounted on the upper structure and adapted to be operated by a work actuator;
    the work machine further including:
        a hybrid drive system comprising:
            an engine,
            a motor generator adapted to be driven by the engine so as to function as a generator as well as receive electric power so as to function as an electric motor,
            an electric power storage device that serves to store electric power fed from the motor generator functioning as a generator, as well as feed electric power to the motor generator functioning as an electric motor, and
            a pump adapted to be driven either one of or both the engine and the motor generator;
        a hydraulic actuator control circuit that serves to control hydraulic fluid fed from the pump of the hybrid drive system to the travel motor and the work actuator;
        a swing control circuit that serves to:
            feed electric power from the electric power storage device of the hybrid drive system to the swing motor generator so that the swing motor generator functions as an electric motor, and
            recover electric power generated by the swing motor generator functioning as a generator to the electric power storage device during braking of rotating motion of the upper structure;
        wherein the hydraulic actuator control circuit further includes:
            an energy recovery motor provided in a return fluid passage though which return fluid recovered from the work actuator flows, the energy recovery motor being adapted to be driven by return fluid and thereby drive the motor generator of the hybrid drive system, and
            a recovery clutch that is provided between the energy recovery motor and the motor generator of the hybrid drive system and serves to enable or interrupt transmission of rotational power.

2. A work machine as claimed in claim 1, wherein:
    the return fluid passage includes:
        a return passage provided with the energy recovery motor,
        another return passage that branches off the upstream side of the energy recovery motor, and
        a flow rate ratio control valve for controlling a flow rate ratio of a flow rate in the first mentioned return passage and a flow rate in the other return passage.

3. A work machine as claimed in claim 1 wherein:
    the work equipment comprises a boom, a stick, and a bucket, which are sequentially connected;
    the work machine includes a plurality of work actuators that comprises a boom cylinder for pivoting the boom, a stick cylinder for pivoting the stick, and a bucket cylinder for pivoting the bucket; and
    the energy recovery motor is disposed in a return fluid passage provided for return fluid from the boom cylinder.

4. A work machine as claimed in claim 3, wherein:
    the hybrid drive system includes a plurality of pumps; and
    the hydraulic actuator control circuit further includes:
        a boom cylinder hydraulic fluid feeding passage for feeding hydraulic fluid from one of the pumps to the boom cylinder,
        a stick cylinder hydraulic fluid feeding passage for feeding hydraulic fluid from another pump to the stick cylinder,
        a boom-to-stick solenoid valve adapted to be moved between a position for enabling the hydraulic fluid to flow from the boom cylinder hydraulic fluid feeding passage to the stick cylinder hydraulic fluid feeding passage and a position for interrupting the flow of fluid, and
        a stick-to-boom solenoid valve adapted to be moved between a position for enabling the hydraulic fluid to flow from the stick cylinder hydraulic fluid feeding passage to the head-side of the boom cylinder and a position for interrupting the flow of fluid.

5. A work machine comprising:

a lower structure adapted to be driven by a travel motor;

an upper structure that is rotatable on the lower structure by a swing motor generator, and a work equipment that is mounted on the upper structure and adapted to be operated by a work actuator;

the work machine further including:

a hybrid drive system comprising:
an engine,
a motor generator adapted to be driven by the engine so as to function as a generator as well as receive electric power so as to function as an electric motor,
an electric power storage device that serves to store electric power fed from the motor generator functioning as a generator, as well as feed electric power to the motor generator functioning as an electric motor, and
a pump adapted to be driven either one of or both the engine and the motor generator;

a hydraulic actuator control circuit that serves to control hydraulic fluid fed from the pump of the hybrid drive system to the travel motor and the work actuator;

a swing control circuit that serves to:
feed electric power from the electric power storage device of the hybrid drive system to the swing motor generator so that the swing motor generator functions as an electric motor, and
recover electric power generated by the swing motor generator functioning as a generator to the electric power storage device during braking of rotating motion of the upper structure;

wherein:
the hydraulic actuator control circuit further includes an energy recovery motor provided in a return fluid passage though which return fluid recovered from the work actuator flows, the energy recovery motor being adapted to be driven by return fluid and thereby drive the motor generator of the hybrid drive system; and
the hybrid drive system further includes:
an engine clutch for enabling or interrupting transmission of rotational power output from the engine, and
a power transmission unit for transmitting engine rotation that has been transmitted to the power transmission unit though the engine clutch to the pump and the motor generator as well as transmitting rotation of the motor generator to the pump.

6. A work machine as claimed in claim 5, wherein:
the hybrid drive system further includes a starter motor generator that is connected in series to the engine so as to receive electric power to start up the engine, as well as be driven by the engine to generate electric power.

7. A work machine as claimed in claim 6, wherein:
the hybrid drive system further includes a motor generator clutch that is disposed between the motor generator and the power transmission unit and serves to enable or interrupt transmission of rotational power.

8. A work machine as claimed in claim 5, wherein:
the work machine further includes a recovery clutch that is disposed between the energy recovery motor and the motor generator of the hybrid drive system and serves to enable or interrupt transmission of rotational power.

\* \* \* \* \*